(12) United States Patent
Canter et al.

US008403270B2

(10) Patent No.: US 8,403,270 B2
(45) Date of Patent: Mar. 26, 2013

(54) CANTED SOLAR ARRAY AND METHOD FOR USING SAME

(75) Inventors: Stanley Canter, Hermosa Beach, CA (US); Jane R. Felland, Palos Verdes, CA (US); David P. Freidhoff, Hermosa Beach, CA (US); Dennis Y. Nakasone, Redondo Beach, CA (US)

(73) Assignee: The Boeing Company, Chicago, IL (US)

( * ) Notice: Subject to any disclaimer, the term of this patent is extended or adjusted under 35 U.S.C. 154(b) by 1581 days.

(21) Appl. No.: 11/521,672

(22) Filed: Sep. 15, 2006

(65) Prior Publication Data

US 2008/0078885 A1 Apr. 3, 2008

(51) Int. Cl.
*B64G 1/44* (2006.01)
(52) U.S. Cl. .................. 244/172.6; 244/172.7
(58) Field of Classification Search ........... 244/158.1, 244/158.4, 159.4, 159.5, 164, 172.6, 172.7; 701/13; 342/356
See application file for complete search history.

(56) References Cited

U.S. PATENT DOCUMENTS

| | | | | |
|---|---|---|---|---|
| 3,559,919 | A * | 2/1971 | Sass | 244/172.7 |
| 4,133,501 | A * | 1/1979 | Pentlicki | 244/172.6 |
| 4,133,502 | A * | 1/1979 | Anchutin | 244/172.6 |
| 4,690,354 | A * | 9/1987 | Frisch | 244/158.1 |
| 4,747,567 | A * | 5/1988 | Johnson et al. | 244/172.6 |
| 5,788,188 | A * | 8/1998 | Damilano | 244/165 |
| 6,068,218 | A | 5/2000 | Cosner et al. | |

OTHER PUBLICATIONS

Thomas Spitzer, "The GGS Spacecraft, Solar Arrays for Space Physics", NASA/GSFC, Space Power Applications Branch, Code 734, Greenbelt, MD 20771, 25th PVSC/ May 13-17, 1996; Washington, DC, pp. 305-308.
Paul Bauer et al., "Power Systems for Communications Satellites", AIAA Paper, No. 66-299, AIAA Communications Satellite Systems Conference, Washington, DC May 2-4, 1966.
Richard Kurland et al., "Advanced Photovoltaic Solar Array Design and Performance", AIAA 92-1058, 1992 Aerospace Design Conference, Feb. 3-6, 1992/Irvine, CA, pp. 1-18.
John Fiore et al., "Mechanical Design and Verification of the Topex/ Poseidon Deployable Solar Array", American Institute of Aeronautics and Astronautics, Inc., pp. 125-135, 1994.
Cary R. Clark et al., "Fits, the Latest and Greatest Lightweight Solar Array for Space", 1st International Energy Conversion Engineering Conference, Portsmouth, Virginia, Aug. 17-21, 2003, American Institute of Aeronautics and Astronautics, Inc., pp. 1-7.
P. Alan Jones et al., "Spacecraft Solar Array Technology Trends", AEC-Able Engineering Company, Inc., Goleta, CA.
Navid S. Fatemi et al., Solar Array Trades Between Very High-Efficiency Multi-Junction and Si Space Solar Cells, Emcore Photovoltaics, Albuquerque, NM, Presented at the 28th IEEE PVSC, Sep. 17-22, Anchorage, AK.

* cited by examiner

*Primary Examiner* — Tien Dinh
*Assistant Examiner* — Richard R Green
(74) *Attorney, Agent, or Firm* — Gates & Cooper LLP

(57) ABSTRACT

A method and apparatus for deploying a fixed and canted solar array of a satellite. The solar array is rotated in a first plane and about a first axis from a stowed position to a first position, rotated about a second axis orthogonal to the first axis from the first position to a deployed position determined by a deployment orbit of the satellite, and locked in the deployed position to prevent further motion of the solar array relative to a satellite body for the operational life of the satellite.

20 Claims, 12 Drawing Sheets

PERSPECTIVE VIEW

PERSPECTIVE VIEW

PRIOR ART

CANTED SOLAR ARRAY AND METHOD FOR USING SAME

BACKGROUND OF THE INVENTION

1. Field of the Invention

The present invention relates generally to spacecraft operations for purpose of generating on-board power, and more particularly, to a system and method for deploying and using a satellite solar array.

2. Description of the Related Art

Solar arrays are used to collect solar energy for use in operational satellites. There are two general approaches to arranging the solar arrays on an operational earth-observing satellite. The first approach (otherwise known as the articulated array technique) is to locate the solar array with its principal axis orthogonal to the principal axis of the observing instrument package (typically at or near the Earth's nadir) and use sun tracking mechanisms to track the Sun and active control systems to orient the solar array to present a surface that is normal to the vector between the Sun and the satellite. The second approach uses fixed solar arrays that are orthogonal to the observing axis. However, in the second approach, the satellite's attitude is controlled so as to present their surface normal to the Sun vector. This is known as the fixed array technique.

When using the articulated array method, the solar array may cause objectionable disturbances to be coupled into the earth sensing instruments thereby detracting from the quality of information obtained from the system. These disturbances arise from two factors inherent is the design of the solar array system, a) the mechanisms (motors, etc.) used to drive the arrays during sun tracking cause mechanical noise or vibration of the solar array; b) attitude changes of the space vehicle required to position the satellite for viewing a desired area of the earth excite vibration modes of the solar arrays. Both of these disturbance sources unavoidably couple into the instrument assembly thereby reducing the quality of information provided by the sensing system.

In the fixed array technique, the structural dynamics problems are avoided by building a rigid fixed array coupled by a bracing structure anchoring the far end of each array to the structure of the satellite. By strengthening and bracing these arrays the disturbances can be eliminated to the degree required; the downside of this approach is that the satellite must be rotated away from the viewing attitude in order that the arrays face the sun during the energy collection period. Thus this method results in a low utility factor of the solar arrays and limits the observing duty factor (since observations are typically not possible when the satellite is oriented to collect solar energy). In practice, arrangements of this design result in a very low duty factor depending on specifics of the orbit, the array size and various load factors.

What is needed is an solar array arrangement that provides adequate power without objectionable disturbances, whether from solar array articulations or from satellite body motion, and a method for deploying such a solar array. The present invention satisfies these needs.

SUMMARY OF THE INVENTION

To address the requirements described above, the present invention discloses a method and apparatus for deploying a solar array of a satellite. In one embodiment, the method comprises the steps of rotating the solar array in a first plane and about a first axis from a stowed position to a first position, rotating the solar array about a second axis orthogonal to the first axis from the first position to a deployed position determined by a deployment orbit of the satellite, and locking the solar array in the deployed position to prevent further motion of the solar array relative to a satellite body for the operational life of the satellite. In another embodiment, the apparatus comprises a satellite body, a solar array coupled to the satellite body, the solar array having a stowed position and a deployed position, a first torquing device, coupled between the satellite body and the solar array, for applying torque to rotate the solar array in a first plane and about a first axis from the stowed position to the deployed position, a second torquing device, coupled to the solar array, for applying a second torque to rotate the solar array about a second axis orthogonal to the first axis from the first position to a deployed position determined by a deployment orbit of the satellite, and a locking device for locking the solar array in the deployed position to prevent further motion for the operational life of the satellite.

BRIEF DESCRIPTION OF THE DRAWINGS

Referring now to the drawings in which like reference numbers represent corresponding parts throughout:

FIGS. 7A-11C are diagrams depicting the deployment of the solar panels; and

DETAILED DESCRIPTION OF PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Figure 1:
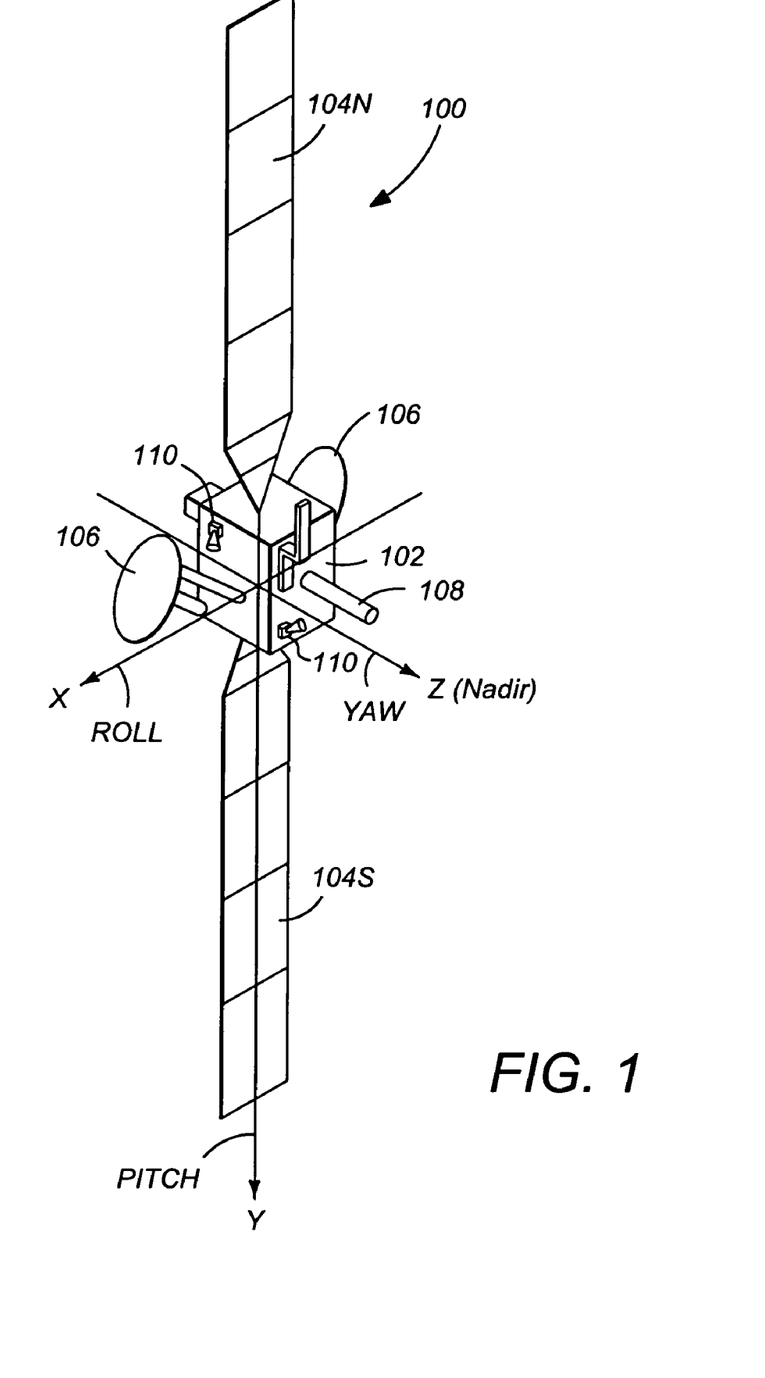
FIG. 1 is an illustration of a three-axis stabilized satellite.

FIG. 1 illustrates a three-axis stabilized satellite or spacecraft 100. The satellite 100 has a main body 102 (which may be referred to as the "satellite bus"), one or more solar panels 104, one or more navigation beam antennas 106E and 106S, and a telemetry and command antenna 108 which is used to communicate with a control ground station. The satellite 100 may also include one or more sensors 110 to measure the attitude of the satellite 100. These sensors may include sun sensors, earth sensors, and star sensors. Since the solar panels are often referred to by the designations "North" and "South", the solar panels in FIG. 1A are referred to by the numerals 104N and 104S for the "North" and "South" solar panels, respectively. The solar panels 104 will also be alternatively referred to hereinafter as the "solar array" or "solar sails."

The three axes of the spacecraft 100 are shown in FIG. 1A. The pitch axis lies along the line of the solar panels' 140N and 140S mutual rotation axes. The roll and yaw axes are perpendicular to the pitch axis and lie in the directions and planes shown.

In the illustrated embodiment, the satellite 100 includes a payload device 108. The payload device 108 may be a sensor (IR, visible light), a transceiver, or other device. The payload device 108 may be mounted on a gimbaled assembly, allowing it to be pointed in a direction of interest. The payload device 108 may also be fixed to the satellite body 102, thus requiring the payload device 108 to be oriented by directing the satellite body 102 in the appropriate direction.

Figure 2:
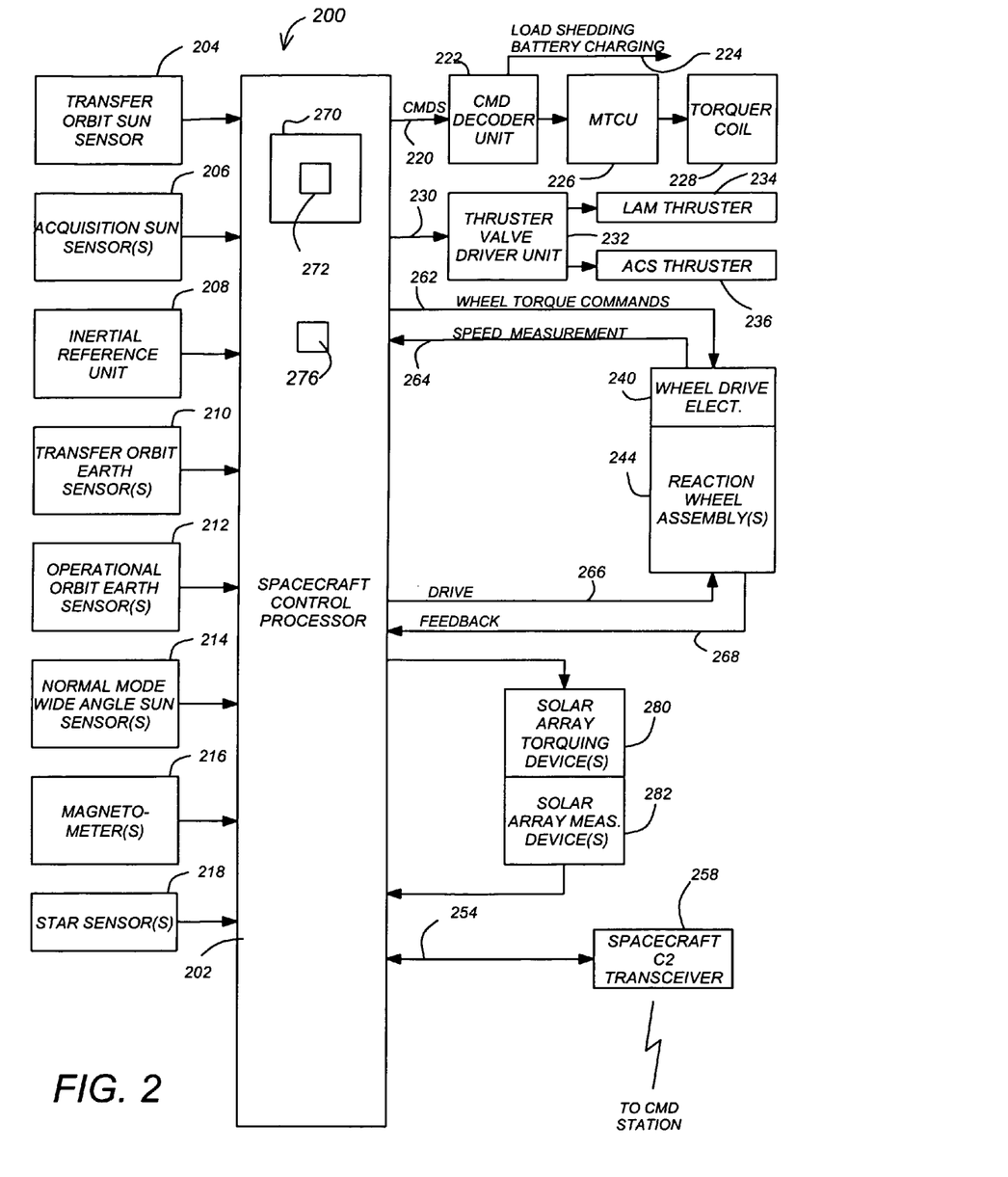
FIG. 2 is a diagram depicting a functional architecture of a representative satellite attitude control system.

FIG. 2 is a diagram depicting the functional architecture of a representative attitude control system 200. Control of the spacecraft is provided by a computer or spacecraft control processor (SCP) 202. The SCP 202 performs a number of functions which may include post ejection sequencing, transfer orbit processing, acquisition control, station-keeping control, normal mode control, mechanisms control, fault protection, and spacecraft systems support, among others.

The SCP 202 may implement one or more processing modules such as payload control module 276, which is used to slew the payload 108 to the proper direction. The payload control module 276 can be implemented in a different processor or in dedicated circuitry.

Input to the spacecraft control processor 202 may come from any combination of a number of spacecraft components and subsystems, such as a transfer orbit sun sensor 204, an acquisition sun sensor 206, an inertial reference unit 208, a transfer orbit Earth sensor 210, an operational orbit Earth sensor 212, a normal mode wide angle sun sensor 214, a magnetometer 216, and one or more star sensors 218.

The SCP 202 generates control signal commands 220 which are directed to a command decoder unit 222. The command decoder unit operates the load shedding and battery charging systems 224. The command decoder unit also sends signals to the magnetic torque control unit (MTCU) 226 and the torque coil 228.

Wheel torque commands 262 are generated by the SCP 202 and are communicated to the wheel drive electronics 240 which command the speed of the reaction wheels in reaction wheel assembly(s) 244. Typically, the spacecraft 100 includes four reaction wheels, at least one in each orthogonal direction, and one for redundancy purposes. The speed of the reaction wheels is also measured and fed back to the SCP 202 by feedback control signal 264. The SCP 202 also communicates commands and data 254 with command stations (further described in connection with FIG. 7) via a satellite transmitter/receiver (or transceiver) 258.

The SCP 202 also commands torquing devices 280 that are used to deploy the solar array 104 and to control the orientation of the solar array 104 after deployment. The dynamic state (e.g. position and/or rotational rate) of the solar array 104 is measured by solar array measurement devices 282 and provided to the SCP 202.

The foregoing describes an exemplary space stabilized satellite attitude control system. The present invention can be implemented with other attitude control system designs as well.

The SCP 202 may include or have access to memory 270, such as a random access memory (RAM). Generally, the SCP 202 operates under control of an operating system 272 stored in the memory 270, and interfaces with the other system components to accept inputs and generate outputs, including commands. Applications running in the SCP 202 access and manipulate data stored in the memory 270. The spacecraft 100 may also comprise an external communication device such as a satellite link for communicating with other computers at, for example, a ground station. If necessary, operation instructions for new applications can be uploaded from ground stations.

In one embodiment, instructions implementing the operating system 272, application programs, and other modules are tangibly embodied in a computer-readable medium, e.g., data storage device, which could include a RAM, EEPROM, or other memory device. Further, the operating system 272 and the computer program are comprised of instructions which, when read and executed by the SCP 202, cause the spacecraft processor 202 to perform the steps necessary to implement and/or use the present invention. Computer program and/or operating instructions may also be tangibly embodied in memory 270 and/or data communications devices (e.g. other devices in the spacecraft 100 or on the ground), thereby making a computer program product or article of manufacture according to the invention. As such, the terms "program storage device," "article of manufacture" and "computer program product" as used herein are intended to encompass a computer program accessible from any computer readable device or media.

Figure 3:
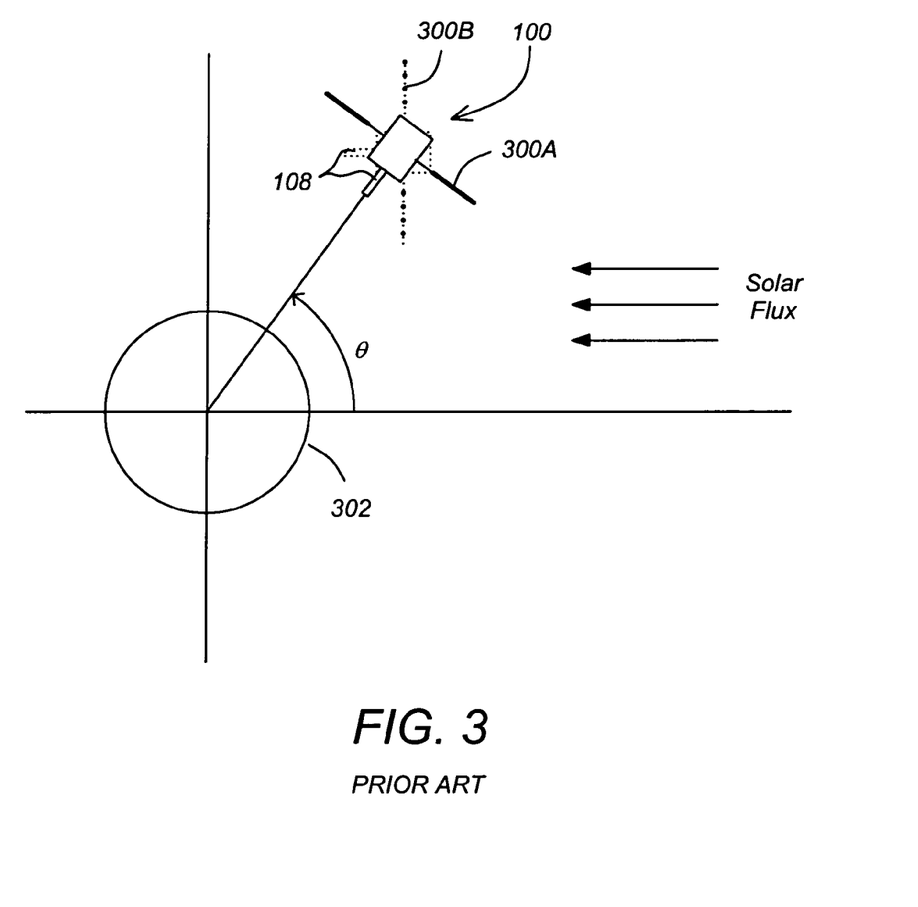
FIG. 3 is a diagram illustrating a prior art fixed solar array solar collection technique.

FIG. 3 is a diagram illustrating the fixed array solar collection technique. Satellite 100 orbits around the Earth 302 in an orbit inclined by θ degrees. The satellite velocity vector is directed into the diagram, and the horizontal axis represents the plane of the Earth's orbit around the Sun. Two satellite orientations are illustrated. In the first orientation 300A the satellite is oriented so that the payload 108 is directed to the Earth nadir (towards the center of the Earth). However, the solar panels 104 of the satellite are not normal to the vector to the Sun, hence, the maximal solar flux is not collected by the solar panels 104 resulting in reduced power availability. In the second orientation 300B, the solar panels 104 are oriented so that they are normal to the vector to the Sun to maximize collection of solar energy, however, the payload 108 is no longer directed at the Earth's nadir.

Figure 4:
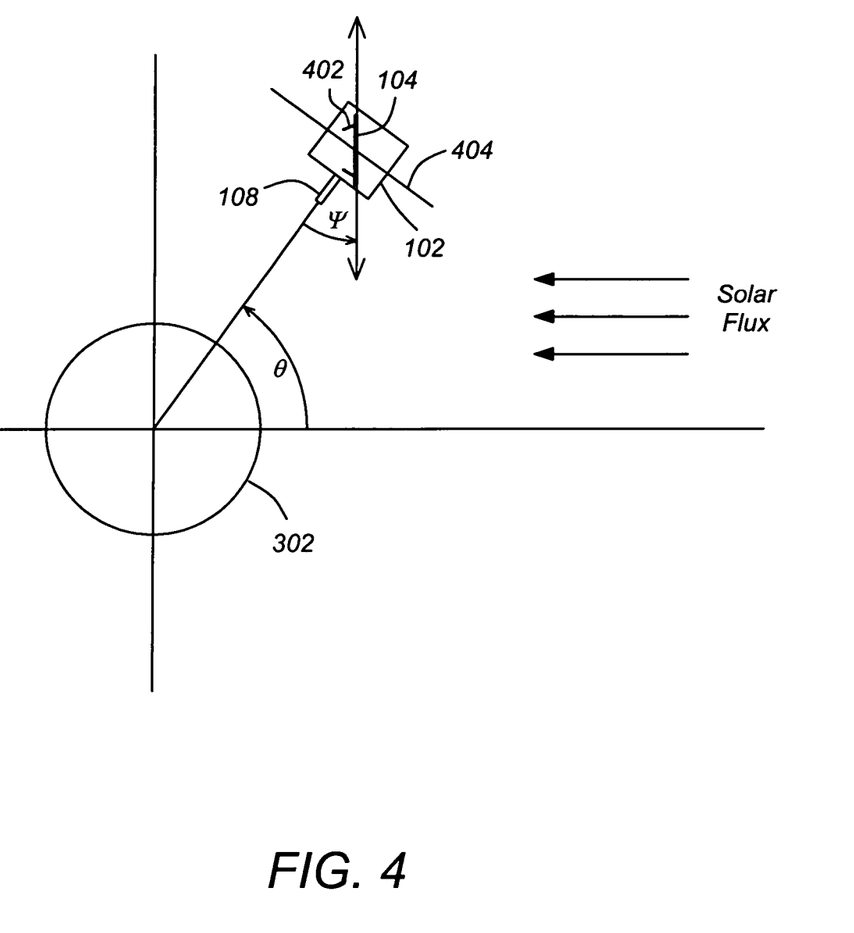
FIG. 4 is a diagram showing a fixed solar array solar collection technique used in one embodiment of the present invention.

FIG. 4 is a diagram showing the one embodiment of the present invention. As was the case in FIG. 3, the solar panels 104 are oriented in a fixed position relative to the satellite body 102, however, the solar panels 104 are canted by an angle ψ nominally offset from the Earth nadir by an amount approximately equal to the orbital inclination of the deployment orbit of the satellite. This nominal cant angle can be altered by a small amount to optimize energy collection when accounting for annual distribution of eclipse duration related to specific orbits and/or the spatial distribution of locations where the payload 108 may be directed to perform the satellite's mission. To prevent unwanted disturbances, bracing 402 may be added.

Figure 5:
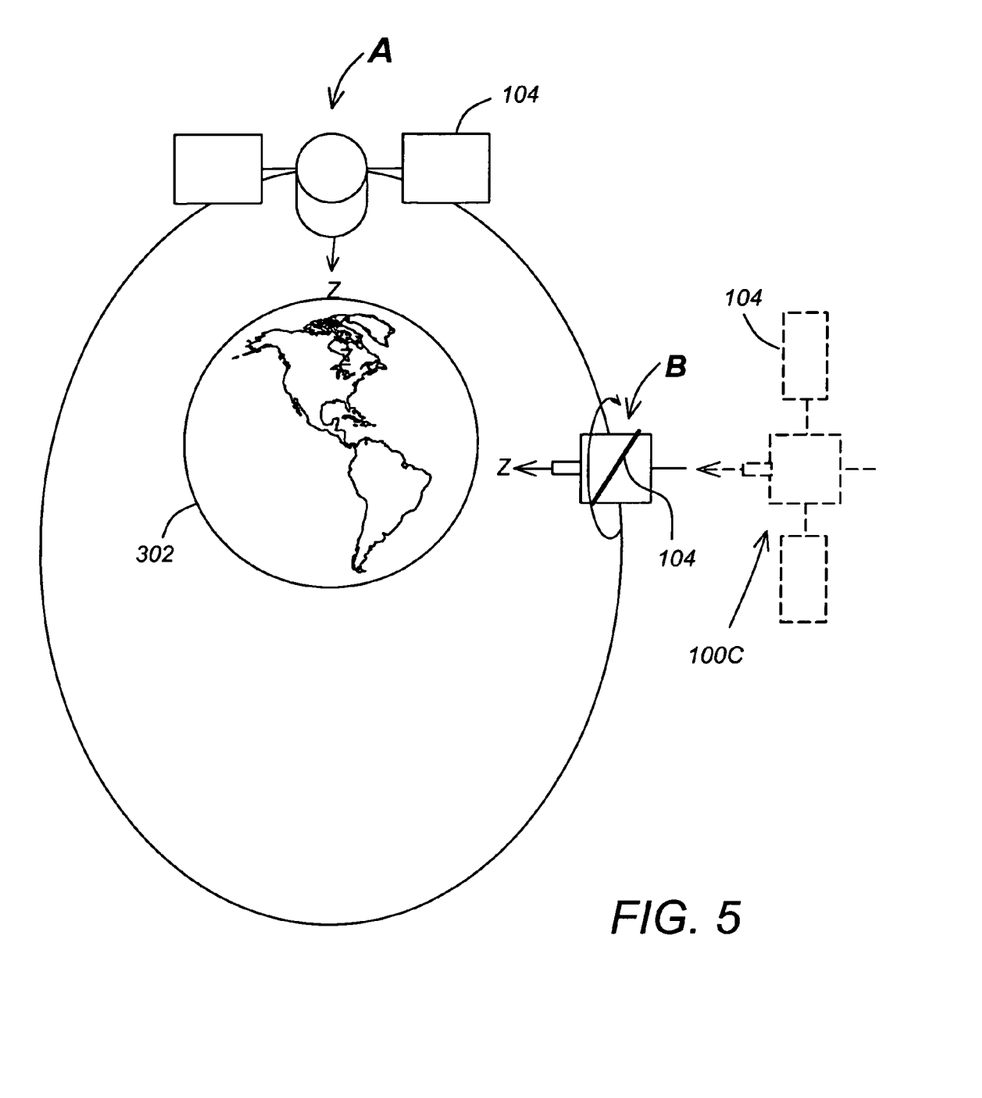
FIG. 5 is a diagram showing the satellite orbit illustrated in FIG. 4, from the Sun's perspective.

FIG. 5 is a diagram illustrating the satellite orbit shown in FIG. 4 from the Sun's perspective. At A, the satellite 100 is disposed such that the payload 108 is directed at the Earth nadir. Since the solar panels 104 are canted as determined from the inclination of the orbit, they are normal to the vector from the satellite to the Sun, thus maximizing the collected solar energy. As the satellite 100 orbits around the Earth 302, the payload 108 remains directed at the Earth nadir. At B, the satellite 100 is still disposed so that the payload 108 is directed at the Earth nadir. However, the rotation of the satellite 100 has caused the solar panels 104 to become edge-on to the solar flux, thus collecting little or no energy. This can be ameliorated by rolling the spacecraft about the Earth nadir (the "Z" or yaw axis) by ninety degrees, to the position/attitude C shown in FIG. 5. While the solar panels 104 are not at right angles to the solar flux, this rotation provides a substantial improvement from the position/attitude B.

While the foregoing has been described as the rotation occurring at position/attitude B, the rotation need not be performed as shown, and may be performed at other times, or incrementally performed at different points in the satellite's orbit.

Figure 6:
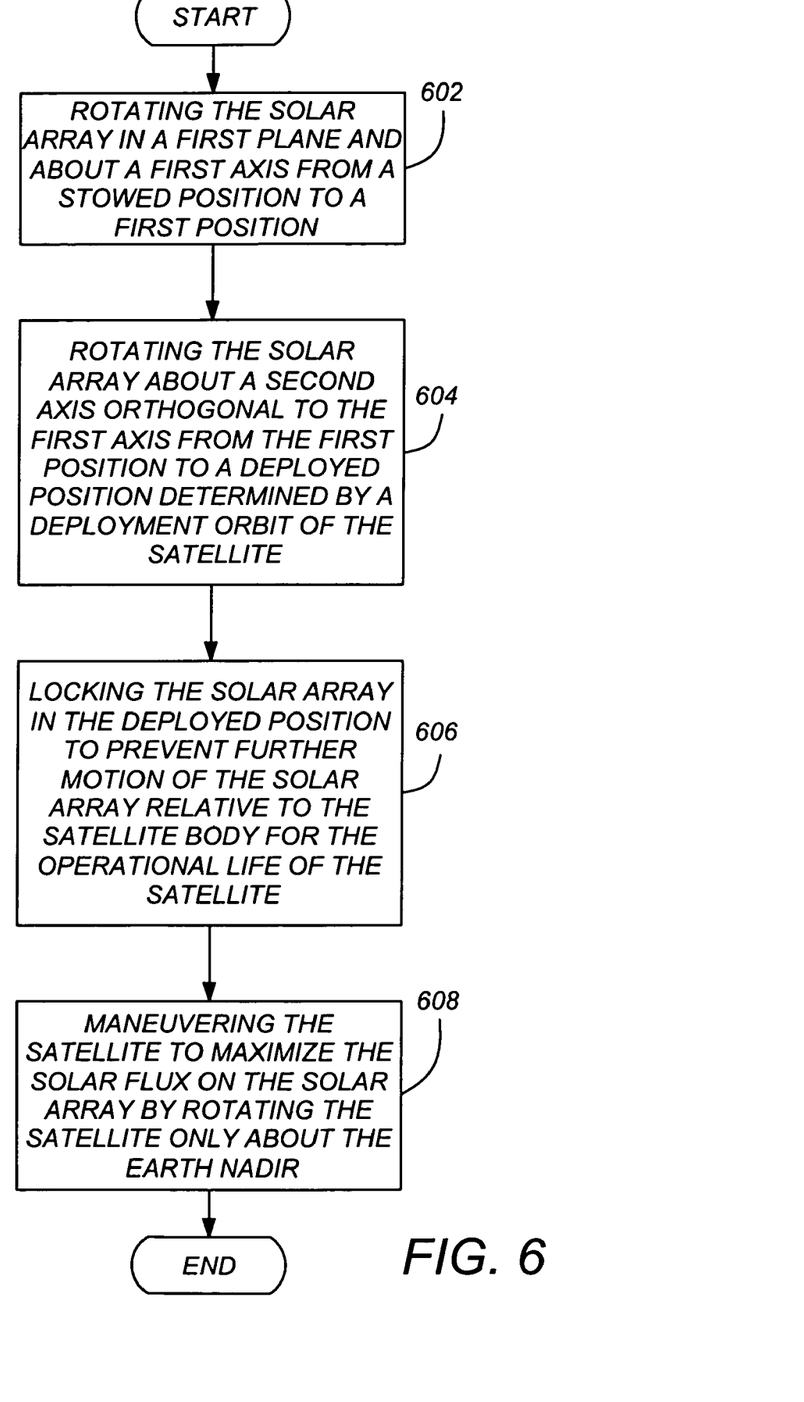
FIG. 6 is a flow chart illustrating the logical flow of a technique for deploying solar panels.

FIGS. 6 and 7A-11C are drawings illustrating a technique for deploying the solar panels 104. FIG. 6 presents a flow chart depicting the logical flow of the technique, while FIGS. 7A-11C present illustrations of the technique being performed from different views.

Figure 7A:
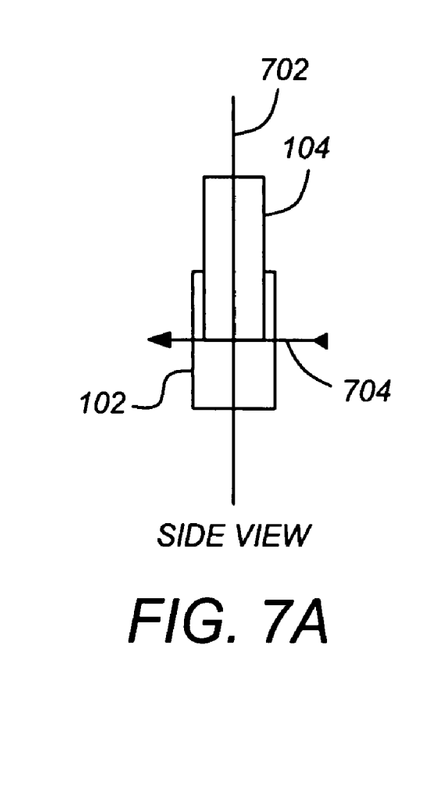
Figure 7B:
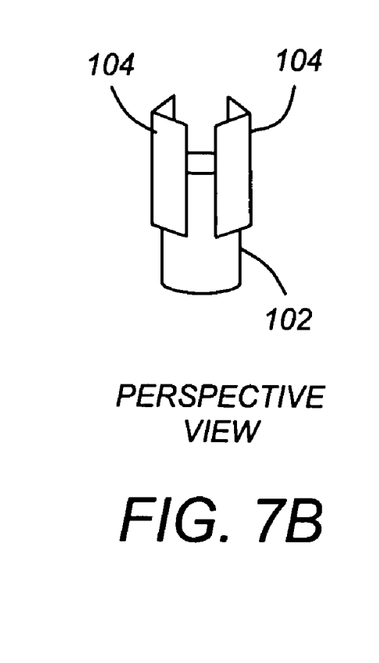
Figure 7C:
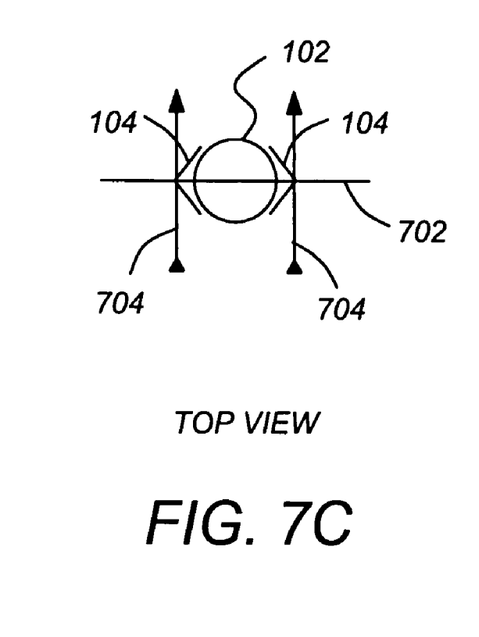
Figure 8A:
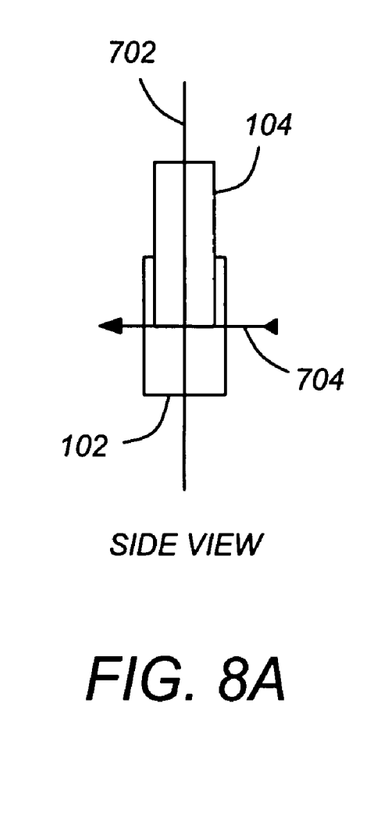
Figure 8B:
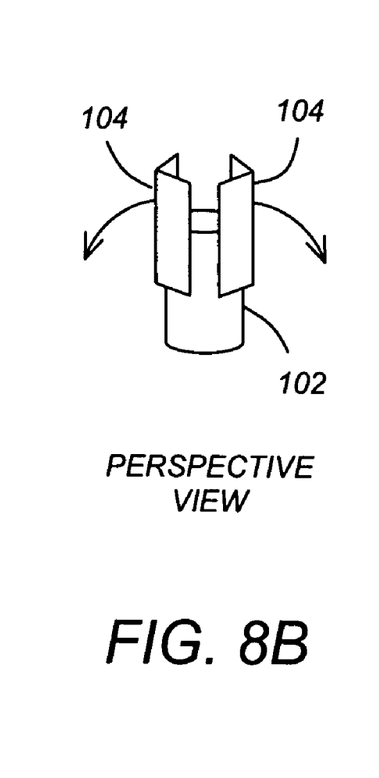
Figure 8C:
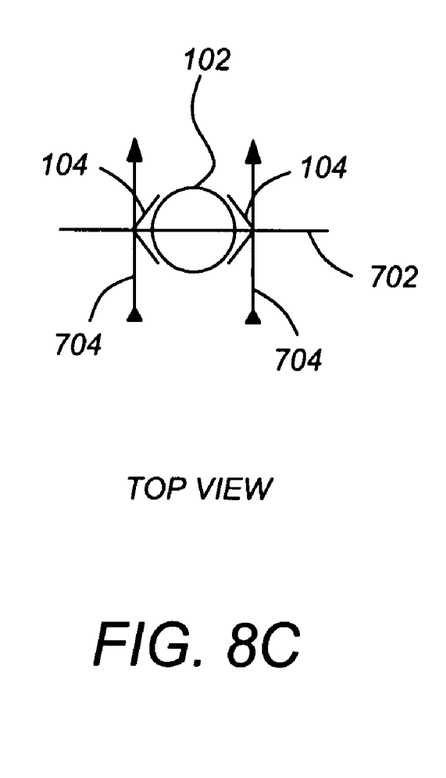
Figure 9A:
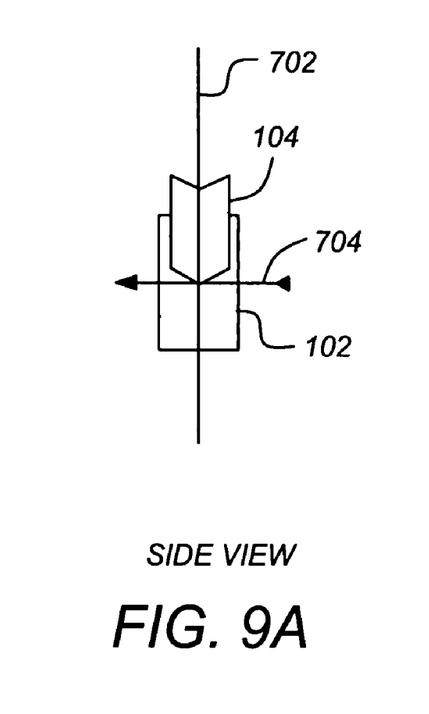
Figure 9B:
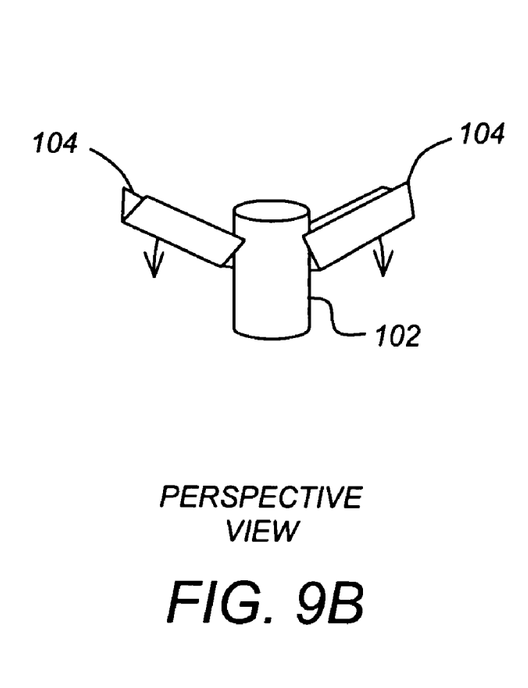
Figure 9C:
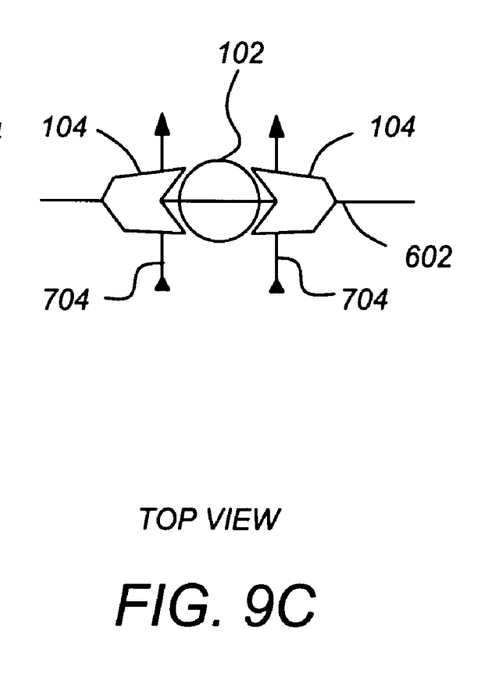
Figure 10A:
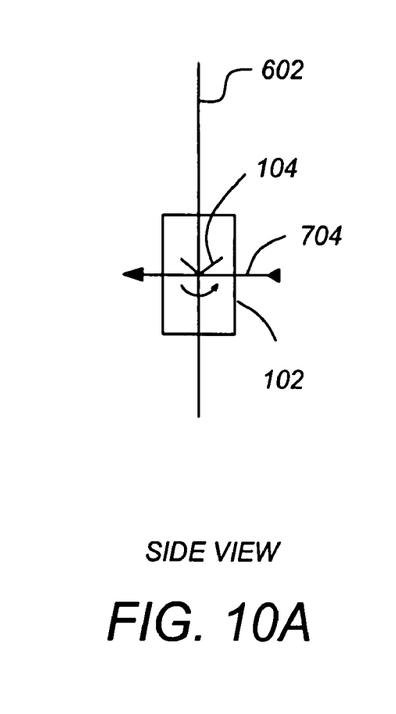
Figure 10B:
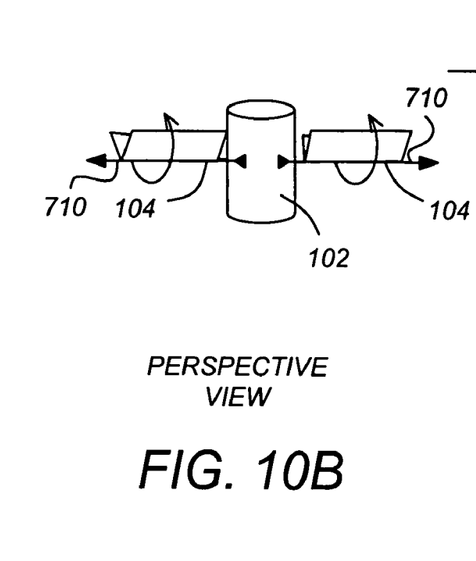
Figure 10C:
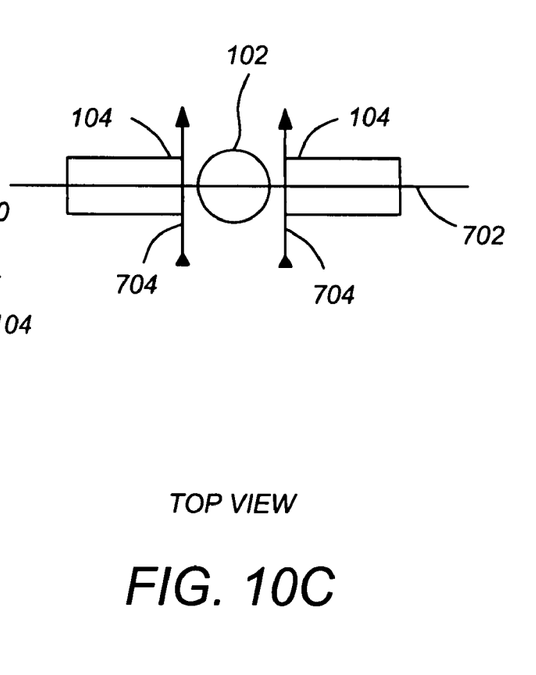

As depicted in block 602, the solar panels 104 are rotated in a first plane 702 and about a first axis 704 from a stowed position to a first position. FIGS. 7A-7C illustrate the satellite 100 and the solar panels 104 in the stowed position. In the illustrated embodiment, the longitudinal axis of the solar wing 104 is parallel to the longitudinal axis of the satellite body 102. FIG. 8B illustrates the direction of the rotation of the solar panels 104 while being rotated in the first plane 702 about the first axis 704. FIGS. 9A-9C illustrate a mid-rotation of the solar panels 104 from the stowed position to the first position. FIGS. 10A-10C illustrates the solar panels 104 in the first position.

Returning to FIG. 6, the solar array 104 is rotated about a second axis 710 orthogonal to the first axis from the first position to a deployed position determined at least in part by the deployment orbit of the satellite, as shown in block 604. In one embodiment, the solar panels 104 are rotated so as to cant them by an angle $\psi$ offset from the Earth's nadir by an amount approximately equal to the orbital inclination of the deployment orbit. Other factors changing the angle $\psi$ from the nominal are the mission-specific factors described above. FIG. 10B illustrates the direction of rotation of the solar array 104 in an exemplary direction. FIG. 10B also illustrates an embodiment in which the solar array 104 longitudinal axis is collinear with the second axis 710.

After the solar array 104 is rotated into the deployed position, it is locked to prevent further motion of the solar array 104 relative to the satellite body 102. The solar array will remain in this position for the operational life of the satellite 100. That is, the solar array 104 will not be moved relative to the satellite body 102 to reorient the solar arrays 104 so as to collect solar energy while the satellite is in operation and performing its mission. Instead, they remain locked into position.

However, as shown in block 608 of FIG. 6, the solar arrays 104 can be maneuvered in inertial space to maximize the solar flux by maneuvering the entire satellite 100 about the Earth nadir (yaw, or Z axis). As long as such maneuvers are limited to those about the Earth nadir, the satellite 100 remains pointed at the Earth, and the payload 108 package can perform the satellite's mission while this maneuver is taking place.

Figure 11A:
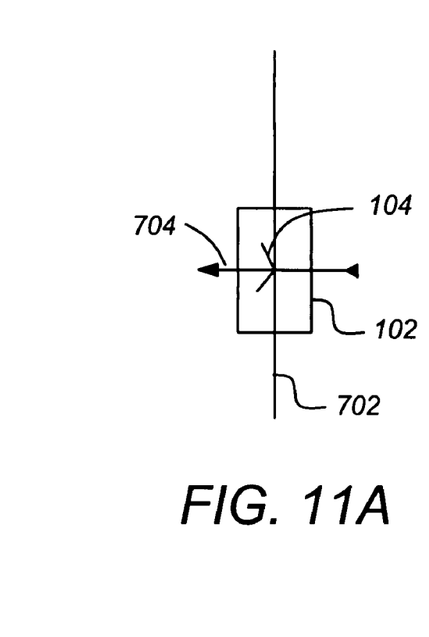
Figure 11B:
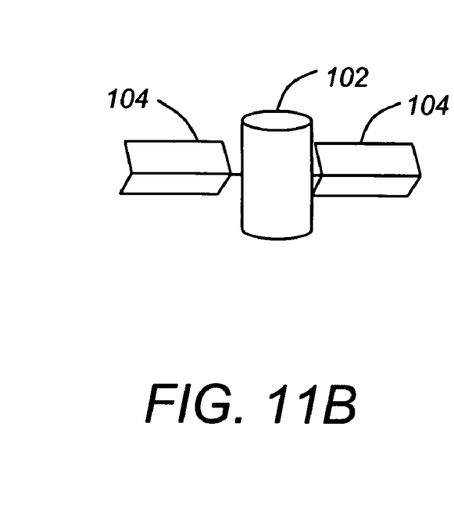
Figure 11C:
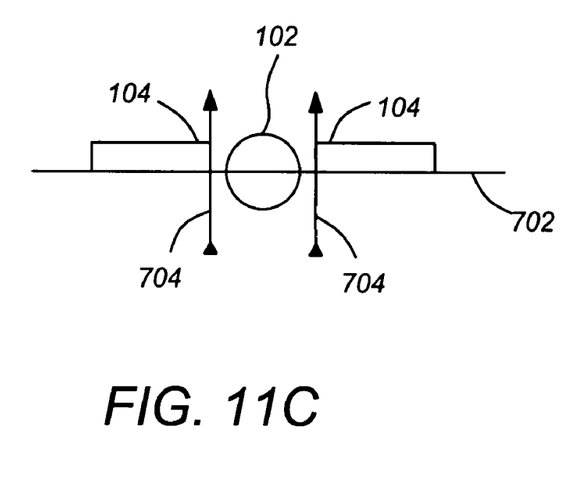

FIGS. 11A-11C are diagrams showing different views of the satellite 100 with locked solar arrays 104. It is worthwhile to note that the solar panels 104 may not be planar. For example, in the embodiments illustrated in FIGS. 7A-11C, the solar panels 104 are somewhat "V" shaped in cross section so that they may more closely follow the outside surface of the satellite body 102 to fit inside the launch vehicle. Solar panels of this type can retain the cross-sectional "V" shape during operation, or they may be designed to spread open to place the panels in a more planar configuration.

Figure 12:
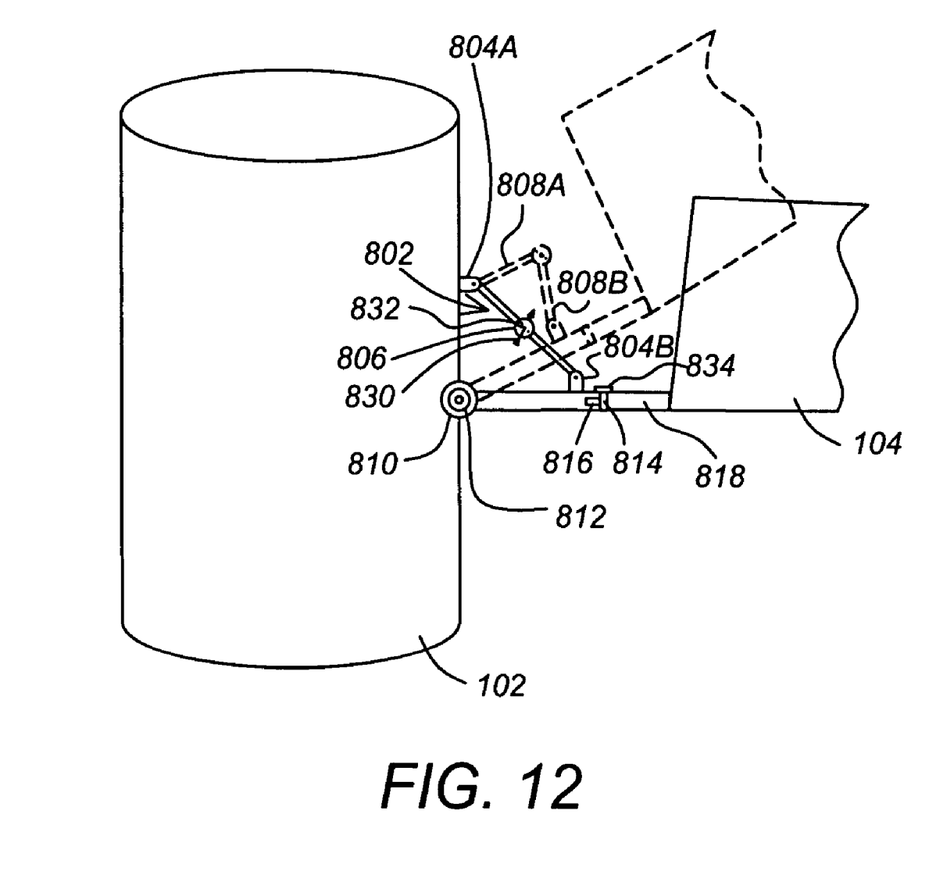
FIG. 12 is a diagram illustrating one embodiment of structures that can be used to deploy the solar arrays and lock them into position.

FIG. 12 is a diagram presenting one embodiment of the structures that can be used to deploy the solar arrays 104 and to lock them in position. In the illustrated embodiment, the solar array 104 is attached to the spacecraft body via a twistable shaft 818 and a rotatable joint 810, thus permitting rotation of the solar array 104 in a first plane (the plane of the paper) about an axis (passing through the paper at the rotatable joint 810). The shaft 818 (and the solar array 104) are rotated using a torquing device 812, which may include a motor, a spring, or any other device capable of applying torque to the rotating joint.

In the illustrated embodiment, a strut 802, which is disposed between the satellite body 102 and the solar array 104, locks the solar array 104 into position. In the illustrated embodiment, the strut 802 includes an elbow joint 806 rotatable about an axis 830 perpendicular to the first plane 702 (perpendicular to the paper). The rotatable joint 810 is coupled to two longitudinal members 808A and 808B, which are coupled to the satellite body 102 and the shaft via rotatable anchor joints 804A and 804B. The elbow joint 806 may comprise a torquing device to urge the twistable shaft 818 from the stowed to the deployed position in addition to or in place of torquing device 812.

The elbow joint 806 may be locked into place (thus locking the twistable shaft 818 into place in the first plane via a locking device 832. The locking device 832 can comprise matching pawls and depressions in the elbow joint 806, or a spring-loaded tab that slides into a notch at the appropriate location. The same or similar locking structures can also be used in the rotatable joint 810. The locking device can also be included within the torquing device that urges the shaft 818 to the appropriate location.

The twistable shaft 818 also includes a rotatable joint 814 and a torquing device 816 for rotating the joint 814 to perform the rotation shown in FIG. 10B. The rotatable joint 814 may also include an integral or separate locking device 834 to lock the rotational position of the twistable shaft 818.

Conclusion

This concludes the description of the preferred embodiments of the present invention. The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for deploying a solar array of a satellite, comprising the steps of:
    rotating the solar array in a first plane and about a first axis from a stowed position to a first position;
    rotating the solar array about a second axis orthogonal to the first axis from the first position to a deployed position determined by a deployment orbit of the satellite; and
    locking the solar array in the deployed position to prevent further motion of the solar array relative to a satellite body for the operational life of the satellite.
2. The method of claim 1, wherein the deployed position of the satellite solar array is canted by an angle $\psi$ offset from the Earth nadir by an amount approximately equal to the orbital inclination of the deployment orbit of the satellite.

3. The method of claim 2, wherein the solar array is locked into position by a strut disposed between the solar array and a satellite body.

4. The method of claim 3, wherein the strut comprises an elbow joint rotatable around a third axis perpendicular to the first plane.

5. The method of claim 4, further comprising the steps of:
maneuvering the satellite to maximize solar flux on the solar array by rotating the satellite only about the Earth nadir.

6. The method of claim 1, wherein a longitudinal axis of the solar array is disposed parallel to a satellite body longitudinal axis when the solar array is in the stowed position.

7. The method of claim 1, wherein the second axis is collinear with a longitudinal axis of the solar array.

8. The method of claim 1, wherein:
the solar array is a first solar array and the satellite comprises a second solar array disposed on side of the satellite opposing the first solar array; and
the second solar array is deployed following the same steps as the first solar array.

9. An apparatus for deploying a solar array of a satellite, comprising:
means for rotating the solar array in a first plane and about a first axis from a stowed position to a first position;
means for rotating the solar array about a second axis orthogonal to the first axis from the first position to a deployed position determined by a deployment orbit of the satellite; and
means for locking the solar array in the deployed position to prevent further motion for the operational life of the satellite.

10. The apparatus of claim 9, wherein the deployed position of the satellite solar array is canted by an angle $\psi$ offset from the Earth nadir by an amount approximately equal to the orbital inclination of the deployment orbit of the satellite.

11. The apparatus of claim 10, wherein the solar array is locked into position by a strut disposed between the solar array and a satellite body.

12. The apparatus of claim 11, wherein the strut comprises an elbow joint rotatable around a third axis perpendicular to the first plane.

13. The apparatus of claim 9, wherein a longitudinal axis of the solar array is disposed parallel to a satellite body longitudinal axis when the solar array is in the stowed position.

14. The apparatus of claim 9, wherein the second axis is collinear with a longitudinal axis of the solar array in the first position.

15. An apparatus, comprising:
a satellite body;
a solar array coupled to the satellite body, the solar array having a stowed position and a deployed position;
a first torquing device, coupled between the satellite body and the solar array, for applying torque to rotate the solar array in a first plane and about a first axis from the stowed position to the deployed position;
a second torquing device, coupled to the solar array, for applying a second torque to rotate the solar array about a second axis orthogonal to the first axis from the first position to a deployed position determined by a deployment orbit of the satellite;
a locking device for locking the solar array in the deployed position to prevent further motion for the operational life of the satellite.

16. The apparatus of claim 15, wherein the deployed position of the satellite solar array is canted by an angle $\psi$ offset from the Earth nadir by an amount approximately equal to the orbital inclination of the deployment orbit of the satellite.

17. The apparatus of claim 16, wherein
the locking device comprises a strut;
the first torquing device is selected from the group comprising a motor and a spring;
the second torquing device is selected from the group comprising a second motor and a second spring.

18. The apparatus of claim 17, wherein the strut comprises an elbow joint rotatable around a third axis parallel to the first axis.

19. The apparatus of claim 15, wherein a longitudinal axis of the solar array is disposed parallel to a satellite body longitudinal axis when the solar array is in the stowed position.

20. The apparatus of claim 15, wherein the second axis is collinear with a longitudinal axis of the solar array.

* * * * *